(12) United States Patent
Jiang

(10) Patent No.: US 12,039,187 B2
(45) Date of Patent: Jul. 16, 2024

(54) POWER-DOWN TEST OF FIRMWARE OF A MEMORY SYSTEM

(71) Applicant: YANGTZE MEMORY TECHNOLOGIES CO., LTD., Wuhan (CN)

(72) Inventor: Yaofeng Jiang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 17/883,373

(22) Filed: Aug. 8, 2022

(65) Prior Publication Data

US 2023/0064884 A1    Mar. 2, 2023

Related U.S. Application Data

(63) Continuation of application No. PCT/CN2021/115677, filed on Aug. 31, 2021.

(51) Int. Cl.
*G06F 3/06* (2006.01)

(52) U.S. Cl.
CPC .......... *G06F 3/0653* (2013.01); *G06F 3/0625* (2013.01); *G06F 3/0679* (2013.01)

(58) Field of Classification Search
CPC ..... G06F 3/0653; G06F 3/0625; G06F 3/0679
See application file for complete search history.

(56) References Cited

U.S. PATENT DOCUMENTS

| | | | |
|---|---|---|---|
| 10,008,288 B2 * | 6/2018 | Lee ........................ | G11C 29/04 |
| 10,147,499 B1 * | 12/2018 | Botea ...................... | G11C 29/12 |
| 2008/0089161 A1 * | 4/2008 | Wong ................ | G11C 29/50004 |
| | | | 365/226 |
| 2017/0097880 A1 * | 4/2017 | Yeh ....................... | G06F 11/3495 |
| 2020/0202971 A1 * | 6/2020 | Giaccio .................. | G11C 5/148 |
| 2022/0382453 A1 * | 12/2022 | Duan ...................... | G06F 3/064 |

* cited by examiner

*Primary Examiner* — Mark A Giardino, Jr.
(74) *Attorney, Agent, or Firm* — BAYES PLLC

(57) ABSTRACT

The present disclosure provides a power-down test method for a firmware of a memory system, a memory system, a computer device, a computer-readable storage medium, and a power-down test system. The disclosed method for testing power-down operations of the firmware of the memory system comprises configuring the firmware by setting a plurality of power-down trigger signal points each associated with a corresponding one of the plurality of preset logic points to be tested, and triggering a plurality of power-down test operations at the plurality of power-down trigger signal points to test the plurality of preset logic points of the firmware.

17 Claims, 3 Drawing Sheets

--- running the firmware to be tested, wherein the firmware to be tested is configured with multiple power-down trigger signal points set corresponding to multiple preset logic points, and sending a power-down test instruction when the firmware to be tested is executed and reaches a power-down trigger signal point — S101 in response to power-down operation of the memory system, the memory system enters a power-down scene at a preset logic point of the firmware to be tested, wherein the power-down operation is performed by a host coupled to the memory system in response to the power-down test instruction — S102 in response to power-recovery operation of the memory system, the memory system enters a power-recovery scene, wherein the power-recovery operation follows the power-down operation and is performed by the host coupled to the — S103

POWER-DOWN TEST OF FIRMWARE OF A MEMORY SYSTEM

CROSS-REFERENCE TO RELATED APPLICATIONS

This application is a continuation of International Application No. PCT/CN2021/115677, filed on Aug. 31, 2021, which is hereby incorporated by reference in its entirety.

FIELD

The present disclosure relates to a field of memory technology, and in particular to a power-down test method for firmware of a memory system, a memory system, a computer device, a computer-readable storage medium, and a power-down test system.

BACKGROUND

A test method usually used for performing a power-down test on UFS (Universal Flash Storage) devices is sending a series of commands through a upper-level software to drive the UFS devices to operate normally, and randomly selecting a power-down time to cut off voltage on the UFS device, such as $V_{CC}$, $V_{CCQ}$, $V_{CCQ2}$ (wherein $V_{CC}$ is used to power flash storage media, $V_{CCQ}$ is used to power input and output interfaces of flash and ground controller of the UFS device, and $V_{CCQ2}$ is used to power other low-voltage modules), to complete the power-down test for the UFS devices.

However, since there are many operating scenarios of the UFS devices and they are running at a relative higher speed, such test method that randomly selects the power-down time externally to perform the power-down test on the UFS devices cannot cover operating scenarios where the power-down test needs to be performed on all the UFS devices.

SUMMARY

In one aspect, the present disclosure provides a power-down test method for firmware of a memory system, wherein the power-down test method comprises: triggering the power-down test at multiple preset logic points of firmware to be tested.

In one aspect, the power-down test method comprises: running the firmware to be tested, wherein the firmware to be tested is configured with multiple power-down trigger signal points set corresponding to the multiple preset logic points, and sending a power-down test instruction when the firmware to be tested is executed and reaches the power-down trigger signal point; in response to power-down operation of the memory system, the memory system enters a power-down scene at the preset logic point of the firmware to be tested, wherein the power-down operation is performed by a host coupled to the memory system in response to the power-down test instruction; and in response to power-recovery operation of the memory system, the memory system enters a power-recovery scene, wherein the power-recovery operation follows the power-down operation and is performed by the host coupled to the memory system in response to the power-down test instruction.

In one aspect, the power-down operation comprises: the memory system is powered down by the host to enter the power-down scene; and the power-recovery operation comprises: the memory system is powered on again by the host to enter the power-recovery scene.

In one aspect, the step of sending the power-down test instruction comprises: sending the power-down test instruction through a preset port of the memory system to a test board on which the memory system is located, wherein the test board is coupled to the host.

In one aspect, the power-down test instruction is a preset rising edge level and/or a preset falling edge level, and the preset port is a general-purpose input and output port.

In one aspect, the memory system comprises a general flash storage.

In another aspect, the present disclosure further provides a memory system, comprising: one or more memory devices for storing data information; a memory controller for controlling the memory device to perform data storage operations in response to instructions of a host; and a memory for storing firmware to be tested that can be executed at the memory controller; wherein the memory controller is configured to implement various steps of the disclosed power-down test method when executing the firmware to be tested.

In another aspect, the present disclosure further provides a power-down test method for firmware of a memory system, the power-down test method comprises: configuring firmware to be tested of the memory system with a first power-down trigger signal point corresponding to a first preset logic point; controlling a host connected to the memory system, so as to drive the memory system to be triggered to perform a first power-down test at the first preset logic point of the firmware to be tested; if the firmware to be tested passes the power-down test at the first preset logic point, removing the first power-down trigger signal point and configuring the firmware to be tested with a second power-down trigger signal point corresponding to a second preset logic point which is different from the first preset logic point; and controlling the host connected to the memory system, so as to drive the memory system to be triggered to perform a second power-down test at the second preset logic point of the firmware to be tested.

In one aspect, the power-down test method further comprises: if the firmware to be tested fails the power-down test at the first preset logic point or the second preset logic point, recording the first preset logic point or the second preset logic point as failing the power-down test.

In one aspect, the power-down test method further comprises: covering the power-down test of all preset logic points of the firmware to be tested by the first power-down test and the second power-down test.

In one aspect, the power-down test method is used to perform a power-down test on a flash translation layer of the firmware to be tested.

In one aspect, the power-down test method further comprises: if the firmware to be tested successfully rebuilds a logical to physical mapping table during the memory system is driven to perform the first power-down test or the second power-down test, determining the firmware to be tested passing the power-down test at the first preset logic point or the second preset logic point.

In another aspect, the present disclosure further provides a computer device comprises a memory, a processor, and a computer program stored on the memory and executable on the processor, wherein the processor is configured to implement various steps of the disclosed power-down test method when the computer program is executed.

In another aspect, the present disclosure further provides a computer-readable storage medium having a computer program stored thereon, wherein the computer program is configured to be executed by a processor to implement various steps of the disclosed power-down test method.

In another aspect, the present disclosure further provides a power-down test system for performing a power-down test of firmware of a memory system, comprising: a tested memory system configured with firmware to be tested, wherein the firmware to be tested is configured with multiple power-down trigger signal points set corresponding to multiple preset logic points, and the memory system is also configured to send a power-down test instruction when the firmware to be tested is executed and reaches the power-down trigger signal point; a test board which carries and is coupled to the memory system; a host coupled to the memory system and is configured to successively control the memory system to be powered down to enter a power-down scene and control the memory system to be powered on again to enter a power-recovery scene if the power-down test instruction corresponding to the memory system is received; a testing device configured to drive the host to configure the firmware to be tested of the memory system with the multiple power-down trigger signal points.

BRIEF DESCRIPTION OF THE DRAWINGS

The drawings that need to be used in the description of the various embodiments according to the present disclosure will be briefly introduced in the followings, so that the technical solution of the present disclosure could be explained more clearly. It is obvious that the drawings in the following description are merely some embodiments of the present disclosure. For those skilled in the art, other drawings can be obtained based on these drawings without creative work.

DETAILED DESCRIPTION

Figure 1:
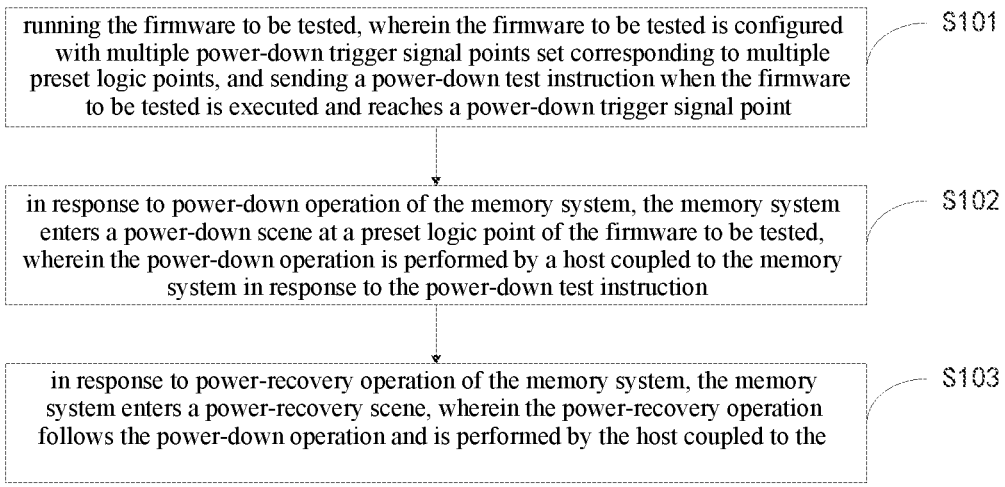
FIG. 1 shows a schematic flow chart of a power-down test method for firmware of a memory system provided according to an embodiment of the present disclosure.

The technical solutions in the embodiments of the present disclosure will be clearly and completely described below in conjunction with the drawings in the embodiments of the present disclosure. Obviously, the described embodiments are only a part of the embodiments of the present disclosure, rather than all of them. Based on the embodiments of the present disclosure, all other embodiments obtained by those skilled in the art without creative work should fall within the scope of the present disclosure.

In the description of the present disclosure, it should be understood that orientation or positional relationship indicated by terms such as "center", "vertically", "horizontally", "length", "width", "thickness", "above", "below", "front", ""back", "left", "right", "vertical", "horizontal", "top", "bottom", "inner", "outer", "clockwise", "counterclockwise" and the like are based on those shown in the drawings, and are intended only to facilitate describing the present disclosure and simplifying the description, rather than indicate or imply that devices or elements must have the specific orientation, or be constructed and operate in the specific orientation, thus it cannot be understood as a limitation to the present disclosure. In addition, terms "first" and "second" are only used for purposes of description, and cannot be understood as indicating or implying relative importance or implicitly indicating the number of the indicated technical features. Therefore, features defined with "first" and "second" may explicitly or implicitly include one or more of the features. In the description of the present disclosure, "plurality" means two or more than two, unless specifically defined otherwise.

In the description of the present disclosure, it should be noted that terms "installed", "connected with", and "connected to" should be understood in a broad sense unless otherwise clearly specified and defined. For example, the terms can be understood as being fixed connected or detachable connected, or integrally connected; the terms can also be understood as being mechanically connected, or electrically connected or able to communicate with each other; the terms can be further understood as being directly connected or indirectly connected through an intermediate medium, or be understood as connectivity inside two elements or interaction of two elements. For those skilled in the art, specific meanings of the above-mentioned terms in the present disclosure can be understood according to specific situations.

In the present disclosure, the first feature is "above" or "below" the second feature may indicate that the first feature directly contacts with the second feature, or the first feature contacts with the second feature through other features between them rather than directly contact therewith, unless specifically specified and defined otherwise. Moreover, the first feature is "on", "above" and "on top of" the second feature may indicate that the first feature being directly above and obliquely above the second feature, or merely indicate that the level of the first feature is higher than that of the second feature. The first feature is "under", "below" and "underneath" the second feature may indicate that the first feature being directly below and obliquely below the second feature, or merely indicate that the level of the first feature is lower than that of the second feature.

The following disclosure provides many different embodiments or examples for implementing different structures of the present disclosure. In order to simplify the disclosure of the present disclosure, components and settings of specific examples are described below. Of course, these are only examples, and are not intended to limit the disclosure. In addition, reference numbers and/or letters may be repeated in different examples of the present disclosure for the purpose of simplification and clarity, and do not indicate relationship between various embodiments and/or settings discussed. Moreover, examples of various specific processes and materials are provided in this application, but application of other processes and/or use of other materials will be appreciated by those of ordinary skilled in the art.

The embodiment of the present disclosure can solve the problem that existing power-down test methods cannot perform power-down test for all scenarios where a general-purpose flash storage device requires power-down testing.

Referring to FIG. 1, a schematic flow chart of a power-down test method for firmware of a memory system provided according to an embodiment of the present disclosure is shown. The power-down test is applied to the memory system, and comprises triggering the power-down test at multiple preset logic points of firmware to be tested of the memory system. The specific process may comprise following steps:

Running step S101: running the firmware to be tested, wherein the firmware to be tested is configured with multiple power-down trigger signal points set corresponding to the multiple preset logic points, and sending a power-down test instruction when the firmware to be tested is executed and reaches the power-down trigger signal point;

Power-down step S102: in response to a power-down operation of the memory system, the memory system enters a power-down scene at the preset logic point of the firmware to be tested, wherein the power-down operation is performed by a host coupled to the memory system in response to the power-down test instruction;

Power-recovery step S103: in response to a power-recovery operation of the memory system, the memory system enters a power-recovery scene, wherein the power-recovery operation follows the power-down operation and is performed by the host coupled to the memory system in response to the power-down test instruction.

It should be noted that, in the embodiments of the present disclosure, since the preset logic point of the firmware to be tested for the power-down test could be configured with corresponding power-down trigger signal points, so that the memory system configured with the firmware to be tested will send out a power-down test instruction when the firmware to be tested is executed and reaches the power-down trigger signal point, indicating the host coupled to the memory system to perform the power-down operation and the power-recovery operation on the memory system successively, thereby enabling the power-down test at the preset logic points of the firmware to be tested. Therefore, the power-down test method provided by the embodiments of the present disclosure can effectively control the logic points of the firmware to be tested for the power-down test, and improve the coverage of the logic points of the firmware to be tested for the power-down test.

Specifically, the foregoing power-down operation may comprise: the memory system is powered down by the host to enter the power-down scene; and the foregoing power-recovery operation comprises: the memory system is powered on again by the host to enter the power-recovery scene.

Further, in the running step S101, the step of "sending a power-down test instruction" may specifically comprise: sending the power-down test instruction through a preset port of the memory system to a test board on which the memory system is located, wherein the test board is coupled to the host.

Specifically, the preset port may be a General Purpose Input/Output (GPIO) port. The above-mentioned test board is used as a transmission bridge for the power-down test instruction between the memory system and the host. The power-down test instruction may be a preset rising edge level and/or a preset falling edge level. The memory system may be, but is not limited to, a Universal Flash Storage (UFS) device.

Figure 2:
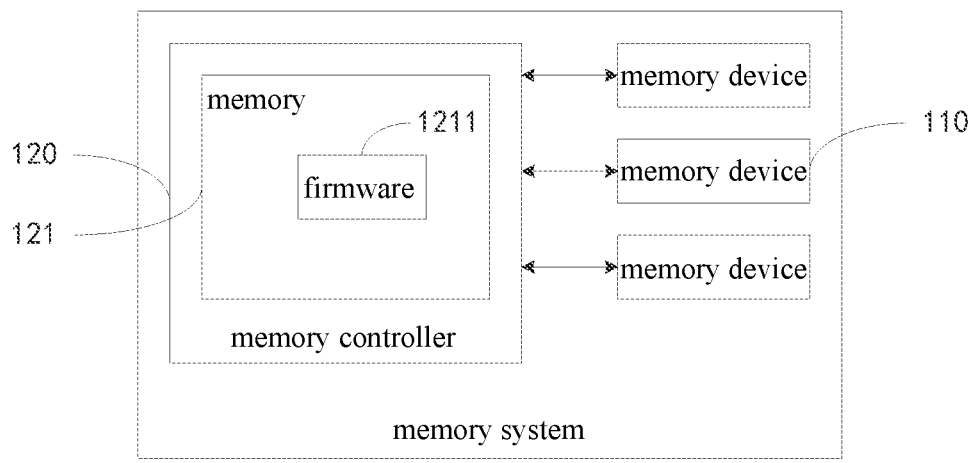
FIG. 2 shows a schematic structural diagram of a memory system provided according to an embodiment of the present disclosure.

Referring to FIG. 2, a schematic structural diagram of a memory system 100 provided according to an embodiment of the present disclosure is shown. As shown in FIG. 2, the memory system 100 includes: one or more memory devices 110 for storing data information; a memory controller 120 for controlling the memory device 110 to perform data storage operations in response to instructions of a host; and a memory 121 for storing firmware 1211 to be tested that can be executed at the memory controller 120; wherein, the memory controller 120 can implement the steps of the power-down test method as described above when executing the firmware 1211 to be tested.

In an embodiment, the memory device 110 may include one or more memory dies, each of which includes a memory array and corresponding peripheral circuits. The memory dies may specifically be, but not limited to, flash memory, such as three-dimensional (3D) NAND flash memory. The memory 121 is different from the memory device 110 which corresponds to the settings of the memory controller 120, and the stored firmware 1211 can be executed by the memory controller 120 to enable functions or operations such as FTL, reading, writing, erasing and the like. The memory controller 120 may include a front-end interface device configured with multiple channels to interact with the host 300 based on protocols such as PCIe. The memory controller 120 may further include a back-end interface device configured with multiple channels to interact with each memory device 110 respectively based on protocols such as Open NAND Flash Interface Working Group (Onfi).

The embodiment of the present disclosure provides a power-down test method for the firmware 1211 of the memory system 100, the power-down test method can be applied to the memory system 100 and comprises: triggering the power-down test at multiple preset logic points of the firmware 1211 to be tested. In the power-down test method provided by the present disclosure, the preset logic point of the firmware 1211 to be tested is configured with corresponding power-down trigger signal point. Thus, when the firmware 1211 to be tested is executed and reaches the preset logic point, the host coupled to the memory system 100 equipped with the firmware 1211 to be tested could be triggered by the configured power-down trigger signal point, to perform the power-down operation and the power-recovery operation on the memory system 100 successively, enabling the power-down test for the preset logic points on the firmware 1211 to be tested. Therefore, the logic points of the firmware 1211 to be tested for the power-down test can be effectively controlled, and the coverage of the logic points of the firmware 1211 which could be tested for the power-down test is improved.

Figure 3:
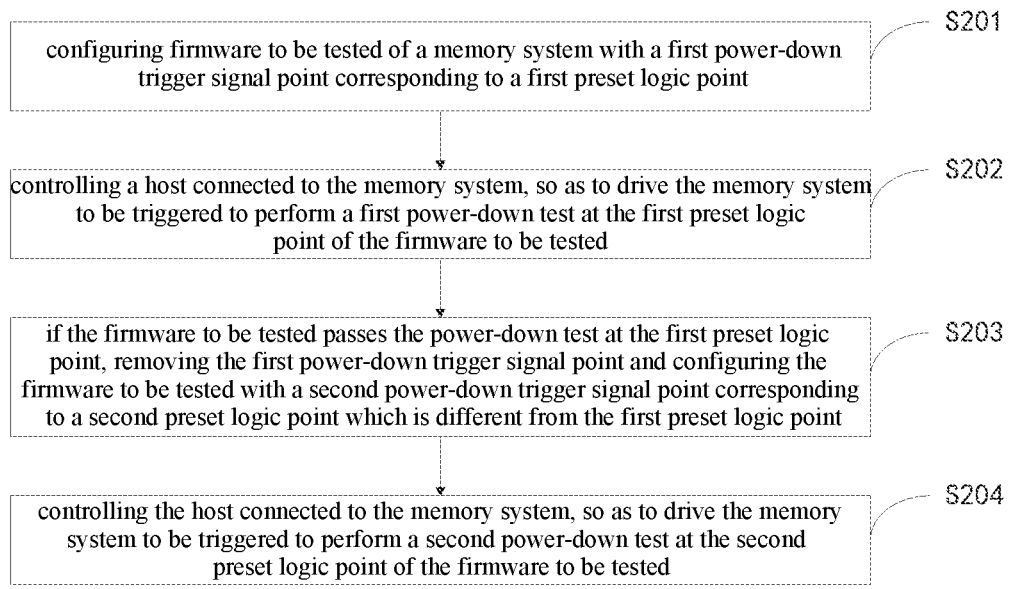
FIG. 3 shows another schematic flow chart of a power-down test method for firmware of a memory system provided according to an embodiment of the present disclosure.

Referring to FIG. 3, another schematic flow chart of a power-down test method for firmware of a memory system provided according to an embodiment of the present disclosure is shown. The power-down test method is applied to a testing device. As shown in FIG. 3, the specific process of the power-down test method could be as follows:

A first configuring step S201: configuring firmware to be tested of the memory system with a first power-down trigger signal point corresponding to a first preset logic point;

A first power-down test step S202: controlling a host connected to the memory system, so as to drive the memory system to be triggered to perform a first power-down test at the first preset logic point of the firmware to be tested;

A second configuring step S203: if the firmware to be tested passes the power-down test at the first preset logic point, removing the first power-down trigger signal point and configuring the firmware to be tested with a second power-down trigger signal point corresponding to a second preset logic point which is different from the first preset logic point;

A second power-down test step S204: controlling the host connected to the memory system, so as to drive the memory system to be triggered to perform a second power-down test at the second preset logic point of the firmware to be tested.

It should be noted that the host will be controlled by the testing device to drive the memory system to enter the power-down scene and the power-recovery scene successively during the above-mentioned first power-down test and the second power-down test, so as to implement the power-down test for the firmware to be tested.

Further, the above-mentioned first power-down test and the second power-down test may be used to perform one or more power-down tests for the firmware to be tested corresponding to a flash translation layer (FTL). Specifically, the FTL may be used to complete a conversion or translation from logical block address (LBA) on the host to physical page address (PPA) on the memory array of the flash memory. As an example, the FTL can use a logical to physical mapping table (L2P mapping table) that represents mapping relationship between the LBA and the PPA to perform the address conversion. The flash memory generally rebuilds the above-mentioned L2P mapping table during the power-recovery after the abnormal power-down of the flash memory. Therefore, as an example, it can be determined that whether the firmware to be tested in the memory system passes the first power-down test or the second power-down test based on whether the L2P mapping table is successfully rebuilt after the firmware to be tested being entered the power-recovery scene.

It should be noted that in the above second configuring step S203, if the firmware to be tested fails the power-down test at the first preset logic point, specifically, for example, the L2P mapping table fails to be rebuilt after the firmware to be tested being entered the power-recovery scene at the first preset logic point, then the first preset logic point can be recorded as failing the power-down test. Accordingly, after the above second power-down test step S204, if the firmware to be tested fails the power-down test at the second preset logic point, specifically, for example, the L2P mapping table fails to be rebuilt after the firmware to be tested being entered the power-recovery scene at the second preset logic point, then he second preset logic point can be recorded as failing the power-down test.

Specifically, the power-down tests of all preset logic points of the firmware to be tested could have similar processes to the first power-down test and the second power-down test as described above, and the power-down test results of all preset logic points of the firmware to be tested can be quantitatively analyzed by the testing device.

Figure 4:
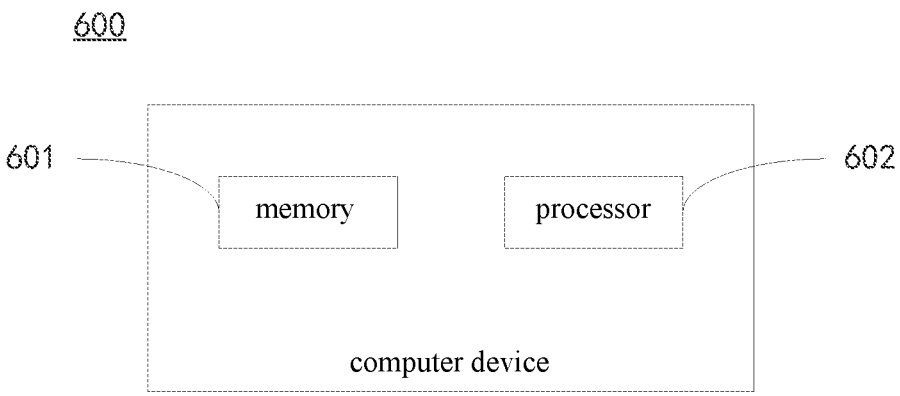
FIG. 4 shows a schematic structural diagram of a computer device provided according to an embodiment of the present disclosure.

Further, referring to FIG. 4, a schematic structural diagram of a computer device 600 provided according to an embodiment of the present disclosure is shown. As shown in FIG. 4, the computer device 600 comprises: a memory 601, a processor 602, and a computer program stored on the memory 601 and executable on the processor 602, wherein the processor 602 can implement the steps in the power-down test method described above when the computer program is executed.

Moreover, the memory 601 in the embodiment of the present disclosure has at least one computer-readable storage medium, and the computer program described above is stored on the computer-readable storage medium.

Figure 5:
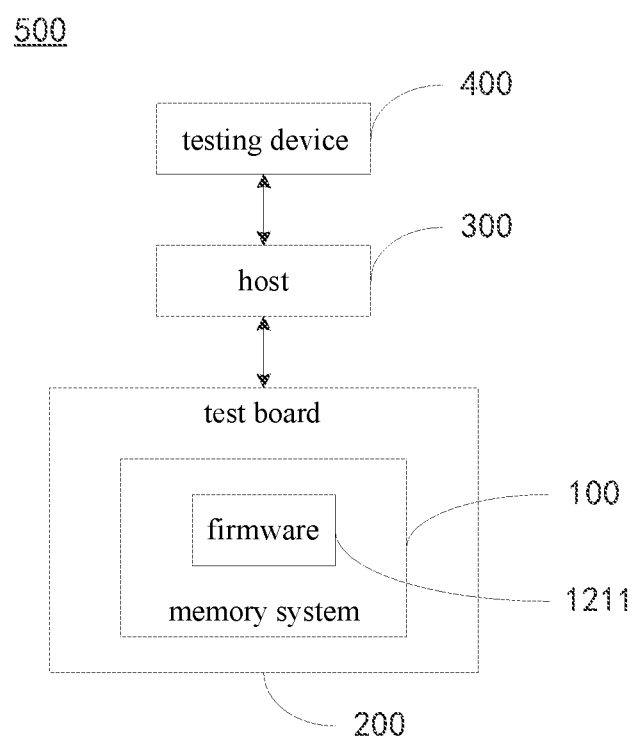
FIG. 5 shows a schematic structural diagram of a power-down test system provided according to an embodiment of the present disclosure.

Referring to FIG. 5, a schematic structural diagram of a power-down test system 500 provided according to an embodiment of the present disclosure is shown. As shown in FIG. 5, the power-down test system 500 includes: a memory system 100 configured with firmware 1211 to be tested, wherein the firmware 1211 to be tested is configured with multiple power-down trigger signal points set corresponding to multiple preset logic points, and the memory system 100 is also configured to send a power-down test instruction when the firmware 1211 to be tested is executed and reaches the power-down trigger signal point; a test board 200 which carries the memory system 100; a host 300 coupled to the memory system 100 and is configured to successively control the memory system 100 to be powered down to enter a power-down scene and control the memory system 100 to be powered on again to enter a power-recovery scene if the power-down test instruction corresponding to the memory system 100 is received; a testing device 400 configured to drive the host 300 to configure the firmware 1211 to be tested of the memory system 100 with the multiple power-down trigger signal points.

Specifically, the above-mentioned test board 200 may be, but not limited to, a software development kit (SDK).

A power-down test method for the firmware 1211 of the memory system 100 is also provided by the embodiment of the present disclosure, the power-down test method is applied to the testing device 400 and comprises: configuring the firmware 1211 to be tested of the memory system 100 with a first power-down trigger signal point corresponding to a first preset logic point; controlling the host 300 connected to the memory system 100, so as to drive the memory system 100 to be triggered to perform a first power-down test at the first preset logic point of the firmware to be tested; if the firmware 1211 to be tested passes the power-down test at the first preset logic point, removing the first power-down trigger signal point and configuring the firmware 1211 to be tested with a second power-down trigger signal point corresponding to a second preset logic point which is different from the first preset logic point; controlling the host 300 connected to the memory system 100, so as to drive the memory system 100 to be triggered to perform a second power-down test at the second preset logic point of the firmware 1211 to be tested. In the power-down test method provided by the present disclosure, the preset logic points of the firmware 1211 to be tested are configured with corresponding power-down trigger signal points. Thus, when the firmware 1211 to be tested is executed by the memory system 100 equipped with the firmware 1211 to be tested and reaches the preset logic point, the power-down test could be triggered to be performed. Therefore, the power-down test method provided by the embodiments of the present disclosure can effectively control the logic points of the firmware 1211 to be tested for the power-down test, and improve the coverage of the logic points of the firmware 1211 which could be tested for the power-down test.

In addition to the above-mentioned embodiments, the present disclosure can also have other implementations. Any technical solution formed using equivalent alternatives or equivalent alternatives falls within the scope claimed by the present disclosure.

In summary, although the preferred embodiments of the present disclosure have been disclosed as above, the above preferred embodiments are not intended to limit the present disclosure. Those of ordinary skilled in the art can make various modifications without departing from the spirit and scope of the present disclosure. Therefore, the protection scope of the present disclosure is defined by the claims.

What is claimed is:

1. A method for testing power-down operations of a firmware of a memory system, comprising:
running the firmware by a memory controller within the memory system, the firmware comprising:
a plurality of preset logic points to be tested, and a plurality of power-down trigger signal points each associated with a corresponding one of the plurality of preset logic points; and triggering, by the memory controller, a plurality of power-down test operations at the plurality of power-down trigger signal points to test the plurality of preset logic points, comprising:

sending, from the memory controller to a host associated with the memory system, a power-down test instruction in response to the firmware reaching one of the plurality of power-down trigger signal points;

in response to a power-down operation performed by the host, controlling the memory system by the memory controller to enter a power-down scene at one of the plurality of preset logic points corresponding to the one of the plurality of power-down trigger signal points; and in response to a power-recovery operation performed by the host, controlling the memory system by the memory controller to enter a power-recovery scene, wherein the power-recovery operation follows the power-down operation.

2. The method of claim 1, wherein triggering the plurality of power-down test operations comprises:

powering down the memory system by the host to enter the power-down scene; and powering on the memory system by the host to enter the power-recovery scene from the power-down scene.

3. The method of claim 1, wherein sending the power-down test instruction comprises:

sending the power-down test instruction through a preset port of the memory system to a test board coupled to the host.

4. The method of claim 3, wherein sending the power-down test instruction comprises:

sending a preset rising edge level signal or a preset falling edge level signal through a general-purpose input/output (GPIO) port of the memory system to the test board.

5. The method of claim 1, wherein the memory system comprises a universal flash storage (UFS) device.

6. The method of claim 5, wherein the firmware is used for a flash translation layer (FTL) of the UFS device configured to translate a logical block address (LBA) of a host associated with the memory system to a physical page address (PPA) of a flash memory array of the UFS device through a logical to physical (L2P) mapping table.

7. A memory system, comprising:
one or more memory devices; and
a memory controller, connected to the one or more memory devices, and configured to:
control the one or more memory devices to perform data storage operations,
execute a firmware of the memory system, wherein the firmware comprises a plurality of preset logic points to be tested, and a plurality of power-down trigger signal points each associated with a corresponding one of the plurality of preset logic points,
trigger a plurality of power-down test operations at the plurality of power-down trigger signal points to test the plurality of preset logic points of the firmware,
send a power-down test instruction to a host associated with the memory system in response to reaching one of the plurality of power-down trigger signal points during the executing of the firmware,
in response to a power-down operation performed by the host, control the memory system to enter a power-down scene at one of the plurality of preset logic points corresponding to the one of the plurality of power-down trigger signal points, and
in response to a power-recovery operation performed by the host, control the memory system to enter a power-recovery scene from the power-down scene.

8. The memory system of claim 7, wherein the memory controller is further configured to:
send the power-down test instruction through a preset port of the memory system to a test board coupled to the host.

9. The memory system of claim 8, wherein the memory controller is further configured to:
send a preset rising edge level signal or a preset falling edge level signal through a general-purpose input/output (GPIO) port of the memory system to the test board.

10. The memory system of claim 7, wherein the memory system comprises a universal flash storage (UFS) device.

11. The memory system of claim 10, wherein the firmware is used for a flash translation layer (FTL) of the UFS device configured to translate a logical block address (LBA) of a host associated with the memory system to a physical page address (PPA) of a flash memory array of the UFS device through a logical to physical (L2P) mapping table.

12. The memory system of claim 7, wherein the one or more memory devices include at least one three-dimensional (3D) NAND flash memory device.

13. A memory controller, comprising:
a memory for storing a firmware of a memory system including one or more memory devices, wherein the firmware comprises a plurality of preset logic points to be tested, and a plurality of power-down trigger signal points each associated with a corresponding one of the plurality of preset logic points; and
wherein the memory controller is configured to:
control the one or more memory devices to perform data storage operations,
execute the firmware and trigger a plurality of power-down test operations at the plurality of power-down trigger signal points to test the plurality of preset logic points of the firmware,
send a power-down test instruction to a host associated with the memory system in response to reaching one of the plurality of power-down trigger signal points during the executing of the firmware,
in response to a power-down operation performed by the host, control the memory system to enter a power-down scene at one of the plurality of preset logic points corresponding to the one of the plurality of power-down trigger signal points, and
in response to a power-recovery operation performed by the host, control the memory system to enter a power-recovery scene from the power-down scene.

14. The memory controller of claim 13 is further configured to:
send the power-down test instruction through a preset port of the memory system to a test board coupled to the host.

15. The memory controller of claim 14 is further configured to:
send a preset rising edge level signal or a preset falling edge level signal through a general-purpose input/output (GPIO) port of the memory system to the test board.

16. The memory controller of claim 15, wherein the firmware is used for a flash translation layer (FTL) of a universal flash storage (UFS) device, the FTL is configured to translate a logical block address (LBA) of the host to a physical page address (PPA) of a flash memory array of the UFS device through a logical to physical (L2P) mapping table.

17. The memory controller of claim 13, wherein the one or more memory devices include at least one three-dimensional (3D) NAND flash memory device.

* * * * *